United States Patent [19]

Chieng et al.

[11] Patent Number: 5,028,407

[45] Date of Patent: Jul. 2, 1991

[54] METHOD OF PRODUCTION OF HIGH PURITY FUSIBLE SILICA

[75] Inventors: Paul C. Chieng, St. Louis, Mo.; Vikram P. Mehrotra, Terre Haute, Ind.; Chin-Liang Chou, Ballwin, Mo.

[73] Assignee: International Minerals & Chemical Corp., Northbrook, Ill.

[21] Appl. No.: 470,270

[22] Filed: Jan. 25, 1990

[51] Int. Cl.$^5$ .............................................. C01B 21/20
[52] U.S. Cl. .................................... 423/338; 423/339; 423/471; 65/18.1
[58] Field of Search ............... 423/339, 338, 470, 471; 65/18.1

[56] References Cited

U.S. PATENT DOCUMENTS

| | | | |
|---|---|---|---|
| 1,903,187 | 3/1933 | McClenahan | 423/339 |
| 2,768,063 | 10/1956 | Domicone | 423/339 |
| 2,780,524 | 2/1957 | Gloss | 423/341 |
| 3,021,194 | 2/1962 | Cunningham | 423/335 |
| 3,271,107 | 9/1968 | Nickerson | 502/232 |
| 3,273,713 | 9/1966 | Parish | 423/484 |
| 3,857,924 | 12/1974 | Halasz | 423/338 |
| 3,968,197 | 7/1976 | Satoh | 423/339 |
| 4,046,860 | 9/1977 | Kidde | 423/341 |
| 4,213,951 | 7/1980 | Sikdar et al. | 423/339 |
| 4,213,952 | 7/1980 | Sikdar | 423/339 |
| 4,298,586 | 11/1981 | Sikdar | 423/339 |
| 4,308,244 | 12/1981 | Sikdar et al. | 423/339 |
| 4,465,657 | 8/1984 | Spijker | 423/339 |
| 4,473,539 | 9/1984 | Scholten | 423/339 |
| 4,683,128 | 7/1987 | Orii et al. | 423/335 |
| 4,767,433 | 8/1988 | Ivra et al. | 65/18.1 |
| 4,775,401 | 10/1988 | Fleming et al. | 65/18.1 |

FOREIGN PATENT DOCUMENTS

| | | |
|---|---|---|
| 0113137 | 7/1984 | European Pat. Off. . |
| 60-42218 | 3/1985 | Japan . |
| 776994 | 11/1980 | U.S.S.R. . |

OTHER PUBLICATIONS

Hackh's Chemical Dictionary, Fourth Edition, p. 299.

Primary Examiner—Olik Chaudhuri
Assistant Examiner—Andrew Griffis
Attorney, Agent, or Firm—Wendell R. Guffey; Thomas L. Farquer; William J. Fisher

[57] ABSTRACT

A method of producing a high purity silica powder which can be fused to form transparent, bubble-free particles. An ammonium fluosilicate solution is purified preliminarily by removing colloidal-sized silica onto which impurities in the solution have been adsorbed. The high purity powder is produced by ammoniation of an unsaturated aqueous solution of ammonium fluosilicate. Silica powder produced is filtered, washed, and dried before fusion. Additional pre-fusion treatments such as washing, hydrothermal leaching, calcination, and a combination thereof, may be utilized to ensure that the concentration of volatile material is low.

27 Claims, 1 Drawing Sheet

Fig.1

METHOD OF PRODUCTION OF HIGH PURITY FUSIBLE SILICA

BACKGROUND OF THE INVENTION

1. Field of the Invention

The present invention relates to a method for producing high purity silica powder which can be fused to form transparent, bubble-free particles. More particularly, the invention relates to a method of recovering such fusible high purity silica powder from an unsaturated solution of ammonium fluosilicate.

2. Description of Related Art

Silica powder typically is produced in a number of ways to serve a variety of purposes. For example, silica can be produced by hydrolysis of a silicon tetrahalide or other silicon-containing compounds, such as tetraethylorthosilicate. These methods typically are not completely satisfactory. Hydrolysis of silicon tetrachloride, for example, can require days to form a gel, while tetraethylorthosilicate is a very expensive raw material.

Silica products produced by these methods typically are suitable only for selected uses. As an example, silica made by ammoniation of ammonium fluosilicate, for example, as taught in U.S. Pat. No. 1,903,187, is useful as adsorbent, but cannot readily be fused to form transparent, bubble-free particles suitable for use in encapsulation of electronic parts or other high-purity, high-density uses described below. According to this patent, ammonium fluosilicate produced during recovery of metals from silicates is ammoniated to produce silica acid precipitate.

U.S. Pat. No. 2,768,063 also discloses a method for producing silica by ammoniating ammonium fluosilicate solution. Ammonium fluosilicate solution which has been filtered to remove insoluble matter is introduced into an excess of aqueous ammonium solution and finely divided amorphous silica is precipitated. The silica is washed and utilized as the "frosting" for the inside of light bulbs. The patent indicates that the temperature of both solutions should be between about 25° and 37° C., and it is important to add the ammonium fluosilicate solution to the ammonium solution. Adding the ammonium solution into the ammonium fluosilicate solution is said to produce too much gel.

U.S. Pat. No. 3,271,107 discloses a process for producing a silica used in pigments by reacting fluosilicic acid with ammonium hydroxide in two stages. Fluosilicic acid is a by product of, e.g., phosphoric acid manufacture, and is produced when silicon tetrafluoride liberated during concentration of phosphoric acid is absorbed in water. Other fluosilicic acid sources are known to those skilled in the art. In the first stage, a less-than-stoichiometric quantity of ammonium hydroxide is added to fluosilicic acid with high agitation to produce a slurry having a pH of between 6.0 and 8.0 containing minute silica particles. The unreacted fluosilicic acid in this slurry then is reacted with sufficient ammonium hydroxide to provide a final pH between about 8.3 and 9.0. Pigment quality silica precipitate then is separated from the slurry.

U.S. Pat. No. 3,021,194 discloses a process for producing ammonium bifluoride from fluosilicic acid and ammonium fluoride without undue loss of ammonia or fluorine. Concentrated fluosilicic acid is reacted with ammonium fluoride, or a mixture of ammonium fluoride and sodium or potassium fluoride, to produce aqueous ammonium acid fluoride (ammonium bifluoride) solution and solid alkali fluosilicate, including ammonium fluosilicate. After separating the solution from the solid alkali fluosilicates, solid ammonium bifluoride is recovered by evaporatively concentrating the solution. Alkali metal fluosilicates can be recovered and sold, or can be converted to alkali fluorides by reaction with additional ammonia. Ammonium fluoride is produced and hydrated silica is precipitated by this ammoniation. The silica is indicated for use as a filler, a flatting agent, or as an insecticide provided it contains some sodium fluoride.

Certain uses of silica require very high purity material. For example, silica used in the encapsulation or packaging of electronic computer chips must have extremely low levels of metal impurities. Typical of these uses is very large scale integrated (VLSI) microchip applications, where chip manufacturers require silica having extremely low concentrations of certain radioactive elements. For example, uranium and thorium concentrations must be on the order of less than 1 part per billion (ppb). The maximum acceptable level of ionic impurities, including cations such as boron, calcium, cobalt, chromium, copper, iron, potassium, magnesium, manganese, sodium, nickel, vanadium, and zinc, and anions containing phosphorus and sulphur, is less than 10 parts per million (ppm), and often is below 1 part per million. The concentration of halogens also should be minimized to reduce chip corrosion and increase chip life.

Other uses for high purity silica material include precision laser optics, fiber optics, and advanced ceramics. These requirements now are satisfied predominantly by natural silica sources such as quartz. Although natural quartz is a crystalline form of silica, such quartz can be made amorphous by fusion techniques known to those skilled in the art. Thus, modified quartz, often called "fused quartz," suitably is used when amorphous silica is required. Unfortunately, prior art processes for recovering silica from contaminated fluosilicic acid starting materials, such as by-product fluosilicic acid recovered from phosphate rock acidulation, have not been satisfactory for producing a product satisfying these stringent purity requirements.

U.S. Pat. No. 4,465,657, for example, discloses a process for producing a purified silica from impure fluosilicic acid which basically uses the procedure of the earlier U.S. Pat. No. 3,271,107. Fluosilicic acid is reacted in a first step with a less—than—stoichiometric quantity of ammonium hydroxide to convert some of the acid to ammonium fluoride and silica. The silica precipitate thus produced removes metal ion impurities, presumably at least in part by adsorption, from the residual fluosilicic acid solution. The silica precipitate is separated, and the remaining solution having a lower level of impurities then is reacted in a second stage with additional ammonium hydroxide to produce a purified silica precipitate. Optionally, the residual fluosilicic acid solution from the first precipitation stage may be treated with an ion exchange or chelating agent to purify the solution further prior to formation of the silica precipitate in the second precipitation stage.

A particular drawback of this procedure is that from 40 to 75 percent of the available silica in the fluosilicic acid is used as the vehicle for removing impurities. Thus, only 25 to 60 percent of the silica values of the fluosilicic acid actually can be recovered in a purified form. Moreover, there is a tacit admission that the two step process does not produce a satisfactory product since it is preferred to treat the solution from the first step process with an ion exchange or chelating agent prior to the second precipitation step.

European Patent Application 0,113,137 attempts to avoid the loss in yield of U.S. Pat. No. 4,456,657 by adding a chelating agent directly to the impure fluosilicate acid solution. Purportedly, the chelating agent improves the purity of the first silica precipitate by sequestering or chelating multivalent metal ions in the solution before ammoniation. Ion exchange also has been used for the same purpose. However, these techniques tend to introduce other impurities, such as alkali metal ions, into the precipitated silica. Additionally, these prior art purification processes rely upon cationic exchangers and metal chelating agents and thus cannot satisfactorily remove the phosphorus and sulphur impurities generally present as anionic species ($SO_4^{-2}$ and $PO_4^{-3}$) in the fluosilicic acid by-product solutions typically recovered from the acidulation of phosphate rock. Nor can anionic exchange agents be used because the anionic exchange agents significantly decrease the recovery of silica.

Silica produced in accordance with these methods is not satisfactory for use in producing high purity, transparent, bubble-free particles because the silica product contains too many impurities. With respect to silica produced by ammoniating ammonium fluosilicate, the subsequently fused particles are not transparent and bubble-free. Methods known in the art for producing fusible silica are complex and difficult to carry out. One alternative, natural quartz, is very expensive and reserves are limited. Further, natural quartz typically is not acceptable for high purity fused product unless it is purified.

Japanese Patent 85(60)/42218 teaches a method of producing high purity silica suitable for electronic uses, for use as a filter for plastic resin, for use in adhesives, and the like. An aqueous solution of an alkali silicate is ultrafiltered to remove colloidal-sized particles. The filtered solution then is purified first with an acidic cation exchange resin, and then with an OH-type anion exchange resin, to obtain a purified silica sol. The purified silica sol is contacted with a precipitant such as ammonium chloride, ammonium nitrate, or ammonium carbonate to cause silica to precipitate. Precipitated silica is collected, then heated.

Soviet Union Patent 776,994 discloses a method for producing transparent, bubble-free quartz glass. Carbon dioxide is bubbled through a sodium metasilicate solution. A precipitate is formed which is washed, and then treated in acid at 130°–200° C. for at least about four hours. Treated precipitate subsequently is filtered, washed, briquetted, fired, and ground. The ground particles are vibro-sorted to segregate a fraction having a density between 1.4 and 1.6 g/cm$^3$, and then are fused to obtain quartz glass.

SUMMARY OF THE INVENTION

This invention relates to a method of producing a high purity silica powder which can be fused to form transparent, bubble-free particles. An ammonium fluosilicate solution is purified preliminarily by removing colloidal-sized silica onto which impurities in the solution have been adsorbed. High purity silica powder then is produced from the aqueous solution of ammonium fluosilicate by ammoniation. During ammoniation, the ammonium fluosilicate solution should be unsaturated. Silica particles produced may be treated to reduce volatile impurities before fusion.

DETAILED DESCRIPTION OF THE INVENTION

The invention relates to the production of high purity silica powder which can be fused to transparent, bubble-free particles. Although high purity silica produced by ammoniation of ammonium fluosilicate is known, such silica generally is very difficult to fuse to form transparent, bubble-free particles. The inventors have discovered that high purity silica powder suitable for fusion to form such particles is produced by the ammoniation of an unsaturated solution of ammonium fluosilicate.

The term "high purity silica" refers to silica containing total metal impurity concentration of less than about 10 ppm and individual non-metallic impurity concentrations, especially sulphur and phosphorus concentrations, of less than about 10 ppm.

"High purity" or "pure," when used to describe a water source or other solution used in carrying out the present invention, means the material has sufficiently low impurity level that any silica ultimately recovered in accordance with the process of the present invention constitutes high purity product as hereinabove defined.

The purity of silica produced in accordance with the method of this invention need not meet each quality standard required of filler material used in encapsulation of VLSI circuits and similar ultra-high purity uses. High purity silica produced in accordance with the method of the invention may contain, e.g., more than 1 ppb of uranium or thorium. Further, the concentration of fluorine may exceed the typical 3 ppm maximum allowed for filler material used to encapsulate VLSI circuits. However, the invention provides a method for reducing the quantity of volatile impurities, such as fluorine, on precipitated silica before fusion. Thustreated silica is suitable for encapsulation filler and similar uses.

Ammonium fluosilicate solution from any source typically is suitable for use in the method of the invention. For example, a solution can be prepared by dissolving pure ammonium fluosilicate crystals in pure water. Similarly, the solution remaining from a recrystallization purification of ammonium fluosilicate can be acceptable. An ammonium fluosilicate solution can be prepared by reacting ammonia and fluosilicic acid solution.

In the practice of the method of this invention, the source of ammonium fluosilicate solution is not important, so long as the silica produced therefrom has the desired purity. If the ammonium fluosilicate solution is not sufficiently pure, it can be purified in a variety of ways known in the art. For example, ammonium fluosilicate crystals can be precipitated from the solution, removed, and redissolved in pure water. The purity of the solution after purification should be such that high purity silica powder and high purity ammonium fluoride solution are recovered.

Purity of silica product is ensured by ensuring the purity of the ammonium fluosilicate. Except with regard to the level of volatile impurities such as fluorine, silica purity cannot be ensured by post-precipitation treatment of the silica product. Processing conditions described herein which yield fusible product do not improve the product purity. Thus, to ensure silica purity, it is important initially to ensure purity of the ammonium fluosilicate solution.

The ammonium fluosilicate solution should be devoid of particulate material. For example, silica which may be present in solution should be removed before ammoniation is begun. This silica typically is not of the quality required to achieve transparent, bubble-free fused particles. Typically, impurities from the ammonium fluosilicate solution are adsorbed onto the surface of the silica. Silica precipitate which is not removed at this time not only degrades the purity of the ultimate silica product but also tends to cause bubble formation in fused products. Thus, this particulate silica, and any other particulate matter present in this solution, must be removed. Any of the known methods of separating particulate solids from liquids, such as filtration and centrifugation, are suitably used for this purpose in the method of this invention.

The concentration of the ammonium fluosilicate solution for subsequent ammoniation must be carefully controlled to ensure that no ammonium fluosilicate crystals are formed when the solution is ammoniated. Although the inventor does not wish to be bound by any particular theory, it is believed that the bubbles observed in fused silica produced using silica made by ammoniation of ammonium fluosilicate solution are caused by unreacted and undissolved ammonium fluosilicate crystallites embedded or occluded in the precipitated silica. Therefore, formation of ammonium fluosilicate crystals during the ammoniation step must be minimized.

The ammonium fluosilicate concentration of the solution must be under-saturated during ammoniation to avoid the above-described potential for inclusion of ammonium fluosilicate crystals. The concentration at which ammonium fluosilicate solution is saturated varies with the temperature of the solution. At about 0° C., the saturation concentration is about 11 wt. percent ammonium fluosilicate. The saturation concentration is about 38 wt. percent at about 100° C. The presence of ammonium fluoride reduces the solubility of ammonium fluosilicate.

Typically, the solution will have a maximum temperature of about 85° C., corresponding to a saturation concentration of about 34 wt. percent. Therefore, the ammonium fluosilicate concentration typically does not exceed about 30 wt. percent. Preferably, the ammonium fluosilicate solution concentration is less than about 20 wt. percent, more preferably is less than about 18 wt. percent, and most preferably is less than about 15 wt. percent. When the ammonium fluosilicate solution concentration exceeds about 18 wt. percent, silica precipitate formed upon ammoniation typically does not fuse to form transparent, bubble-free fused silica particles without pre-fusion treatment to remove volatile impurities such as fluorine-containing compounds.

According to this invention, the aqueous ammonium fluosilicate solution of the desired purity and concentration is ammoniated to precipitate high purity silica and yield a high purity ammonium fluoride liquor in accordance with the following reaction:

(I)

The temperature of the solution during the reaction typically may vary from about 25° to 85° C. The temperature of the ammonium fluosilicate solution must be maintained above the temperature at which the solution is saturated, preferably at least about 25° C. above saturation temperature, and more preferably at least about 40° C. above saturation temperature. Most preferably, the solution temperature is maintained between about 60° and 70° C.

Batch-wise operation preferably is employed to minimize formation of ammonium fluosilicate crystals. The solubility of ammonium fluosilicate is reduced in the presence of ammonium fluoride because the double salt $NH_4F \cdot (NH_4)_2SiF_6$ forms. For example, at 25° C., the saturation concentration of ammonium fluosilicate in water is about 18.5 wt. percent. However, at the same temperature, the ammonium fluosilicate saturation concentration is reduced significantly in the presence of ammonium fluoride. For example, the saturation concentration of ammonium fluosilicate ranges from about 11.5 wt. percent at an ammonium fluoride concentration of 7.9 wt. percent to about 8.2 wt. percent at an ammonium fluoride concentration of 20.1 wt. percent. At higher ammonium fluoride concentration, the ammonium fluosilicate saturation concentration is even lower.

Typically, one would prefer to maximize the concentration of ammonium fluosilicate, inter alia, to minimize the quantity of water which must be treated to obtain the required purity, minimize the quantity of waste streams, and minimize the size of processing equipment. However, high ammonium fluosilicate concentration may increase the probability of ammonium fluosilicate crystallites becoming embedded or occluded in precipitated silica, especially when a continuous process is utilized. Continuous ammoniation tends to produce locally high ammonium fluoride concentrations in the ammonium fluosilicate solution, thus decreasing the ammonium fluosilicate saturation concentration and increasing the likelihood of forming ammonium flousilicate crystallites and occluding or embedding these crystallites in the silica precipitate. Therefore, if continuous processing is utilized, the concentration of ammonium fluosilicate solution preferably is maintained below about 18 wt. percent, more preferably below about 15 wt. percent, and most preferably below about 12 wt. percent. Further, colloidal silica thus produced preferably is further treated before fusion to remove volatile constituents, such as fluorine, which may be introduced through the feed. Typical fluorine and volatile component reduction techniques are described below.

During ammoniation, ammonia is sparged into unsaturated ammonium fluosilicate solution which is mechanically agitated. Agitation ensures adequate distribution of ammonia throughout the solution for complete conversion of ammonium fluosilicate to silica. Agitation also ensures that local ammonium fluosilicate concentration does not exceed saturation concentration and prevents formation of gel.

The amount of ammonia utilized is at least about the stoichiometric quantity required to complete reaction I. Preferably, an excess of between about 5–30 percent, more preferably between about 10–30 percent, and most preferably, between about 20–30 percent of the stoichiometric amount of ammonia is used to ensure that the ammonium fluosilicate is exhausted. Therefore, the quantity of ammonia utilized is at least about 100 percent, preferably is between about 105–130 percent, more preferably is between about 110–130 percent, and most preferably is between about 120 and 130 percent of the stoichiometrically required quantity.

Silica precipitate can be separated from the ammonium fluoride solution by any suitable separation technique known in the art, such as filtration. A suitable separation technique should not introduce impurities into the solution or onto the silica. Recovered silica may be washed with purified water or other suitable solvents to remove residual ammonium fluoride solution from the silica. Typically, either hot or cold water is used in a plurality of washes. After washing, silica precipitate is dried at a temperature of less than about 200° C. to ensure dryness.

Silica precipitate produced by ammoniation of high purity ammonium fluosilicate solution having a concentration of less than about 18 wt. percent typically does not require pre-fusion treatment to yield transparent, bubble-free amorphous silica upon fusion. However, this fused amorphous silica may have more than 3 ppm extractable fluorine, as determined by the Parr bomb method (described below), and thus would not be suitable for use as filler in electronic encapsulation material. Pre-fusion treatment intended to lower the concentration of volatiles, especially fluorine, may be utilized to improve the quality of the subsequently fused product. Sources of fluorine in precipitated silica include, inter alia, ammonium fluosilicate crystallites, residual ammonium fluoride, and $NH_4F \cdot (NH_4)_2SiF_6$ double salt crystallites.

As described above, treatment to reduce volatiles, especially fluorine, typically is necessary to produce transparent, bubble-free amorphous particles from silica precipitate produced by ammoniation of ammonium fluosilicate solution having a concentration of at least about 18 wt. percent. Suitable methods of fluorine reduction include aqueous washing, hydrothermal leaching, and calcination. Combinations of these methods often are especially effective at reducing fluorine concentration on silica particles to less than about 3 wppm before fusion. Any method may be used which achieves the objective of removing absorbed fluorine-containing impurities and crystallites, which may form bubbles in fused particles, without adversely affecting the purity of the particulate silica during treatment.

Aqueous washing is especially effective for quickly reducing high fluorine concentrations. High purity water at temperature of between about 20° and 25° C. is suitable. A quantity of water, typically about 10 times the mass of the silica, is combined with silica being treated. Thereafter, additional water can be introduced in a manner so that it displaces water already present. Alternatively, silica precipitate is separated from the water before additional water is introduced. Suitable separation techniques include centrifugal separation and vacuum filtration. A plurality of such washes may be utilized. These and other methods of washing are suited for use in the present invention.

Hydrothermal leaching is especially effective for removing fluorine at low concentration from silica. A quantity of water, typically about 10 times the mass of the silica, is mixed with silica in an autoclave or similar vessel which is capable of containing super-atmospheric pressure at a temperature above about 100° C. Then, the vessel is sealed and the temperature and pressure are raised to leach fluorine out of the silica. After a predetermined period, treatment is stopped and the silica and water are separated.

Conditions of treatment vary with the degree of fluorine removal required. For example, a long treatment period is required to achieve a particular result than is required at more severe conditions, i.e., higher pressure or temperature. Obviously, the severity of treatment required also depends upon the degree of fluorine removal desired. Those skilled in the art will be able to determine appropriate treatment conditions without undue experimentation. Skilled practitioners also appreciate that the apparatus utilized must not introduce a quantity of impurities sufficient to degrade the quality of fused silica.

The silica may be claimed after having been washed and dried or further treated by washing or hydrothermal leaching. Particles can be calcined at a temperature between about 500°–1200° C., preferably at a temperature of between about 600° and 850° C., more preferably at about 800° C. Typically, the duration of such treatment is less than 4 hours. However, heat treatment at such elevated temperatures often leads to mutual adherence of the particles and formation of chunks. Such chunks must be broken down before particles are fused. Pulveration equipment constructed of non-metallic components is utilized to achieve size reduction.

The calcination furnace is fitted with high-purity saggers which do not introduce impurities to the silica being calcined. Quartz and silicon carbide typically are suitable materials of construction. A muffle furnace, a rotary calciner, and similar equipment can be used. Skilled practitioners recognize that the temperature during calcination should not exceed about 1200° C., lest chunks be formed and particles adhere to the saggers. Typically, an atmosphere inert to silica, such as nitrogen, is introduced into the furnace. Similarly, the atmosphere in the furnace may be purged during calcination.

To ensure that the silica is suitable for producing transparent bubble-free amorphous silica, washed and dried silica should have an extractable fluorine value less than about 1.3 wt. percent and a loss on ignition (LOI) at 150° C. of less than 0.4 wt. percent. However, the scope of this invention is not limited to silica which satisfies both criteria because silica which fails to satisfy one or both criteria may produce suitable fused product. Those skilled in the art will be able to prepare suitably fused product by following the guidance provided herein. To ensure that the silica is suitable as filler for, e.g., encapsulation of electronic chips, the washed and dried silica preferably has an extractable fluorine value less than about 20 wppm, preferably less than about 15 wppm.

The extractable fluorine value is determined by the Parr Bomb method. In this method, a known quantity of deionized water is combined with a known quantity of silica and sealed in an autoclave. The autoclave is heated to about 160° C. for about 20 hours without stirring. Determination of LOI is a technique well-known in the art.

Silica produced in accordance with the method of the invention can be flame-fused to form transparent, bubble-free amorphous silica particles having relatively high density and suitable for uses requiring high-purity, dense, amorphous silica. Suitable fusion apparatus, typically called "torches", are known to those skilled in the art. Typical of commercially-available apparatus are a quartz Vernueil torch made by A. W. Fusion, Georgetown, Del., and a Bethlehem bench burner PM2D, Model B.

Those skilled in the art are familiar with the operation of such apparatus. They may be arranged so that fused particles are discharged horizontally, or vertically upwardly or downwardly. Suitable arrangement can be determined with a minimum of experimentation by the practitioner. Similarly, auxiliary equipment, such as powder feeders, apparatus temperature control, fuel supply, particle collectors, and the like, can be selected in accordance with the design of the apparatus. Typically, hydrogen is utilized as the fuel in preference to carbon-containing fuels such as methane, propane, or natural gas to minimize the opportunity to contaminate the silica with carbon particles.

Figure 1:
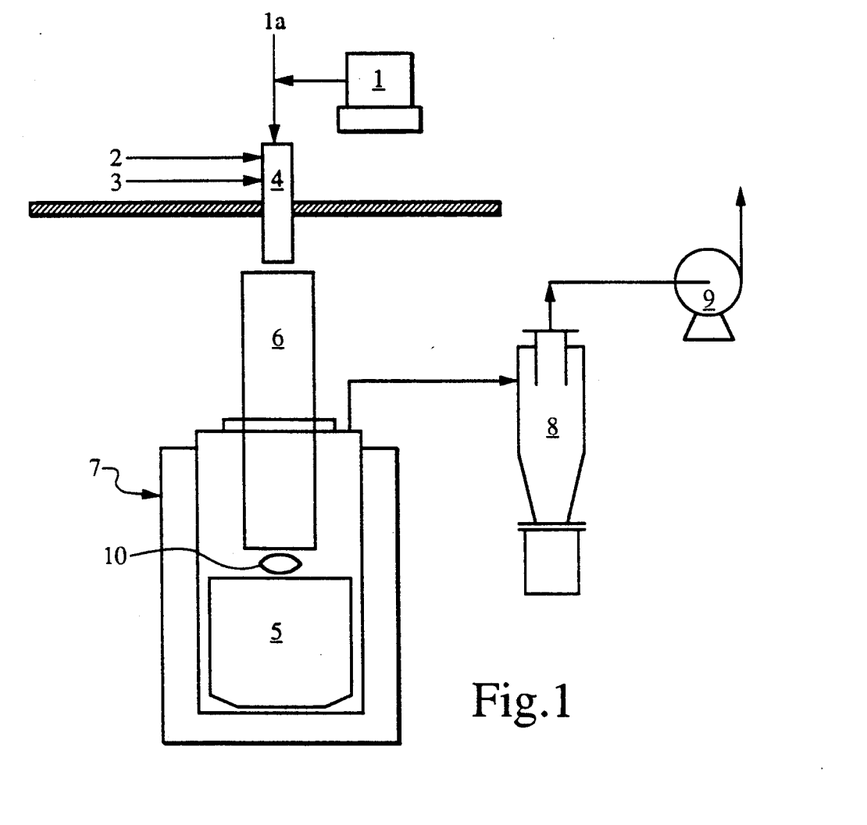
FIG. 1 schematically illustrates a suitable flame fusion apparatus.

A Vernueil quartz tube torch oriented vertically downward is illustrated in FIG. 1. Silica powder is supplied to a powder feeder 1. The powder is intimately admixed with oxygen from source 1a and supplied to a flame which results from the combustion of fuel, preferably hydrogen, introduced from fuel source 2, and oxygen from the powder feed together with additional oxygen introduced from oxygen source 3 and fuses the silica powder into particles. Typically, powder is fed to the center of the flame through a plurality of symmetrically arranged conduits in nozzle or torch 4, with fuel and additional oxygen fed through concentric conduits which surround the symmetrically arranged powder feed conduits.

Fused particles are directed from the flame to quartz crucible 5 in teflon-lined durable (typically stainless steel) vessel 7 through quartz tube 6. Fused silica particles are collected in crucible 5, while combustion products, uncombusted oxygen, and silica fines are exhausted through at least one cyclone 8, wherein the silica fines are separated from gasses and vapors, which are exhausted at 9. Samples may be obtained from sampling device 10.

The over-riding consideration during selection of apparatus is the purity and integrity of the fused particles. The fusion apparatus and auxiliary equipment must not add significant quantities of contaminants of any sort, especially those which degrade the product quality and preclude production of pure, dense, amorphous transparent particles. For example, an operator may apply an anti-static compound to the powder to reduce static charges thereon. Acceptable anti-static compounds include those which leave essentially no residue in the fused silica products. An example of a suitable anti-static compound is 1 percent quaternary ammonium salt ($NH_4Cl$) and 0.2 percent ammonium acetate in ethanol and water. Skilled practitioners are familiar with other suitable anti-static compounds.

The following examples are intended to further illustrate the invention, not to limit the invention in any way. The invention is limited only by the scope of the appended claims.

EXAMPLE 1

Table 1 below summarizes the quality difference between silica produced in accordance with the method of the invention utilizing 15 wt. percent ammonium fluosilicate solution from which colloidal silica previously had been filtered and the colloidal silica. The data in the table clearly illustrate that silica already present in ammonium fluosilicate solution is less pure than silica produced in accordance with the method of the invention.

TABLE 1

| Chemical Analysis of Silica in AFS and Silica from Filtered AFS | | |
|---|---|---|
| Element | Colloidal Silica in AFS, ppm | Silica From Filtered AFS, ppm |
| Al | 3.2 | 0.4 |
| Ba | 0.4 | T |
| Ca | 20 | 0.2 |
| Cd | T | T |
| Cr | T | T |
| Cu | 0.15 | T |
| Fe | 14 | 2.5 |
| K | 0.5 | 0.2 |
| Mg | 24 | 1 |
| Mn | 0.2 | T |
| Mo | T | T |
| Na | 0.8 | 0.4 |
| Ni | T | T |
| P | 1.2 | T |
| S | 65 | 2 |
| V | T | T |
| Zn | 4.5 | 1.1 |

T = Less than 0.1

EXAMPLE 2

Three ammonium fluosilicate (AFS) solutions which contained colloidal silica and had an ammonium fluosilicate concentration of 26 wt. percent were processed in diverse procedures. A series of dilute solutions was prepared from each 26 wt. percent solution. In some cases, the colloidal silica was filtered, and both batch and continuous ammoniation were used.

These tests are summarized in Table 2 below.

TABLE 2

| | Results of Fusion Test | | | |
|---|---|---|---|---|
| Sample | AFS Conc. % | AFS Filtered | Batch/ Continuous | Quality of Fused Prod. |
| A-10 | 10 | No | Batch | NG |
| A-15 | 15 | No | Batch | NG |
| A-17.5 | 17.5 | No | Batch | NG |
| A-20 | 20 | No | Batch | NG |
| A-26 | 26 | No | Batch | NG |
| B-10 | 10 | Yes | Batch | OK |
| B-13 | 13 | Yes | Batch | OK |
| B-15 | 15 | Yes | Batch | OK |
| B-20 | 20 | Yes | Batch | OK |
| B-26 | 26 | Yes | Batch | NG |
| C-13 | 13 | No | Continuous | NG |
| C-15 | 15 | Yes | Continuous | NG |
| C-26 | 26 | No | Continuous | NG |

NG = Not free of bubbles

This example illustrates that the quality of fused silica product produced by ammoniation was judged to be unacceptable for those processes when colloidal silica was not removed from ammonium fluosilicate solution, when continuous ammoniation was used, and when the ammonium fluosilicate concentration exceeded about 20 wt. percent.

EXAMPLE 3

Silica was prepared by ammoniation of a 13 wt. percent ammonium fluosilicate solution. The solution was ammoniated at temperatures between about 60° and 70° C. to an $NH_3/F$ mol ratio of greater than about 1.2. Silica thus produced was washed and dried, then fused. Table 3 below summarizes fused silica quality as it relates to extractable fluorine and LOI at 150° C. The table illustrates that when the quantity of extractable fluorine, as determined by the Parr Bomb method described herein, does not exceed 1.3 wt. percent and the LOI at 150° C. does not exceed about 0.4 wt. percent, product which is essentially bubble free is produced. (Samples 8, 9, and 13). Further, some having one or both characteristics outside the above-described extractable fluorine level and LOI at 150° C., such as Samples 1, 2, 5, 6, 7, 11, 12, 14, and 16, produce acceptable fused product, although the fluorine concentration typically is too high for product to be used in electronic encapsulation.

TABLE 3

Effect of Washing And Drying on Fusion Quality

| Sample | Quality | Extractable Fluorine, Wt. % | LOI at 150° C. |
|---|---|---|---|
| 1 | Good | 3.00 | 0.38 |
| 2 | Good | 1.40 | 0.47 |
| 3 | NG | 1.60 | 1.25 |
| 4 | NG | 2.30 | 0.23 |
| 5 | Good | 2.20 | 0.35 |
| 6 | Good | 2.80 | 1.24 |
| 7 | Good | 2.50 | 0.28 |
| 8 | Good | 1.20 | 0.28 |
| 9 | Good | 1.40 | 0.37 |
| 10 | NG | 2.40 | 0.22 |
| 11 | Good | 2.50 | 0.34 |
| 12 | Good | 2.30 | 0.43 |
| 13 | Good | 0.35 | 0.02 |
| 14 | Good | 2.70 | 0.89 |
| 15 | NG | 3.30 | 2.90 |
| 16 | Good | 3.00 | 1.26 |
| 17 | NG | | 3.35 |
| 18 | NG | 2.80 | 0.91 |
| 19 | NG | 6.10 | 10.57 |
| 20 | NG | 5.70 | 5.42 |
| 21 | NG | 14.80 | 22.24 |
| 22 | NG | 2.50 | 3.89 |
| 23 | NG | 4.50 | 4.30 |
| 24 | NG | 8.50 | 13.21 |
| 25 | NG | 1.40 | 0.43 |
| 26 | NG | 2.90 | 28.62 |
| 27 | NG | 2.70 | 1.65 |
| 28 | NG | 3.40 | 1.74 |
| 29 | NG | 1.90 | 47.18 |
| 30 | NG | 5.70 | 5.47 |
| 31 | NG | 8.30 | 11.70 |
| 32 | NG | 3.90 | 12.63 |

NG = Not free of bubbles

EXAMPLE 4

The quartz Vernueil torch illustrated in FIG. 1 was used to fuse silica powder prepared in accordance with the method of the invention.

The silica precipitate was washed twice with cold deionized water and six times with boiling deionized water, dried, then calcined at 850° C. for 24 hours. Thus-calcined particles were sieved through an 80 mesh polyester screen. The particles which passed through the screen were fused using hydrogen fuel and pure oxygen.

The hydrogen flame was directed downward into a fused quartz crucible (12 inches in diameter by 11 inches high) without the aid of a blower to direct the flame downward. The fusion was carried out in a Class 100 clean hood to minimize contamination. The fused particles then were washed to remove unfused and fine particles.

Table 4 summarizes the purity of the silica after each stage.

TABLE 4

| Element, ppm | Purity of Silica After Different Stages of Processing | | | |
|---|---|---|---|---|
| | Washed | Calcined | Fused | Fused & Washed |
| Al | 0.06 | 0.14 | 0.74 | 0.52 |

TABLE 4-continued

| Element, ppm | Purity of Silica After Different Stages of Processing | | | |
|---|---|---|---|---|
| | Washed | Calcined | Fused | Fused & Washed |
| Ca | 0.01 | 0.13 | 0.36 | 0.37 |
| Co | N | N | N | 0.01 |
| Cr | N | N | N | N |
| Cu | N | 0.02 | 0.02 | 0.01 |
| Fe | 0.03 | 0.25 | 0.73 | 0.46 |
| Mg | 0.05 | 0.14 | 0.13 | 0.15 |
| Mn | 0.03 | N | N | N |
| Ni | N | 0.02 | 0.01 | 0.02 |
| P | N | N | N | 0.07 |
| Ba | N | N | N | N |
| Cd | N | 0.01 | 0.01 | 0.01 |
| Mo | N | N | N | N |
| Pb | 0.03 | 0.02 | 0.01 | N |
| Sr | N | N | N | N |
| V | N | N | 0.03 | 0.04 |
| S | N | N | N | 0.05 |
| Zn | 0.04 | 0.09 | 0.09 | 0.02 |
| Na | 0.02 | 0.02 | 0.02 | 0.02 |
| K | 0.02 | 0.02 | 0.02 | 0.02 |
| F | 26 | 9.8 | 1.4 | 0.2 |

Note: N means not detected.
F: water extractable fluoride; total fluoride value after 2 cold washes is 166 ppm.

EXAMPLE 5

Samples of silica were divided into 2 lots to provide a comparison of the silica fluorine content which results when centrifugation and filtration are utilized to separate silica from the wash water. In each case, the water/silica ratio was 10:1 and the silica was dried to 200° C. before fluorine analysis.

The data in Table 5 illustrate that fluorine is removed more efficiently when silica is well-separated from the wash water, i.e., when the solids content of the silica is high after separation. The data also illustrate that either separation technique is suitable for use in the method of the invention.

TABLE 5

Silica Washing Study

| | % Solid in Cake | F ppm in Solid |
|---|---|---|
| LOT I Centrifuge | | |
| Start | 49.04 | 34000.0 |
| 1st Wash | 57.67 | 2680.0 |
| 2nd Wash | 59.33 | 170.0 |
| 3rd Wash | 62.12 | 47.0 |
| 4th Wash | 60.26 | 11.5 |
| 5th Wash | 58.89 | 61.0 |
| 6th Wash | 55.30 | 46.0 |
| LOT I Filtration | | |
| Start | 27.20 | 63000.0 |
| 1st Wash | 37.96 | 19400.0 |
| 2nd Wash | 40.08 | 2734.0 |
| 3rd Wash | 45.35 | 194.0 |
| 4th Wash | 44.34 | 90.0 |
| 5th Wash | 35.62 | 94.0 |
| LOT II Centrifuge | | |
| Start | 44.00 | (Note 1) |
| 1st Wash | 54.17 | 7400.0 |
| 2nd Wash | 55.83 | 550.0 |
| 3rd Wash | 51.50 | 55.0 |
| 4th Wash | 58.57 | 38.0 |
| 5th Wash | 54.00 | 8.7 |
| LOT II Filtration | | |
| Start | 44.00 | (Note 1) |
| 1st Wash | 52.00 | 17000.0 |
| 2nd Wash | 45.00 | 1500.0 |

TABLE 5-continued

| Silica Washing Study | | |
|---|---|---|
| | % Solid in Cake | F ppm in Solid |
| 3rd Wash | 44.00 | 47.0 |
| 4th Wash | 44.40 | 13.0 |
| 5th Wash | 45.90 | 14.0 |

Note 1 - Analysis not available; samples are identical.

EXAMPLE 6

The data in Table 6 summarize the fluorine concentration as a function of time for silica undergoing hydrothermal leaching. The data illustrate that hydrothermal leaching is a technique suitable for quickly lowering the fluorine concentration.

In each case, a water/silica ratio of 10:1 was used. For samples 6-1 and 6-2, the leaching was carried out at a temperature of 150° C. and a pressure of 4.6 atm. Sample 6-3 was treated at 115° C. in an apparatus which had an aspirator, i.e., a mechanism which allowed gas to escape.

TABLE 6

| | F on Silica, wppm | | |
|---|---|---|---|
| Elapsed Time, min. | Sample 6-1 | Sample 6-2 | Sample 6-3 |
| 0 | 23,000 | 138 | 138 |
| 5 | 6,300 | 25 | — |
| 120 | — | — | 15* |
| 240 | 550 | 18 | |
| 480 | — | 13 | |
| 600 | 379 | — | |

*Determined by Parr Bomb method.

EXAMPLE 7

Five-gram samples of silica precipitate were calcined at temperatures of 1100° C., 1200° C., and 1300° C. for 30 minutes. Resultant fluorine levels are summarized in Table 7A. Lot A was introduced into the furnace at the beginning of the heating cycle, while Lot B was introduced when the furnace reached the calcination temperature.

Table 7B summarizes the fluorine level in larger samples calcined at higher temperature.

These data indicate that sufficient time should be allowed for the silica to reach the desired calcination temperature. Also, longer calcination time may be required for samples having a high fluorine concentration.

TABLE 7A

| Temperature °C. | Feed, F (%) | Calcined Sample, F (ppm) | |
|---|---|---|---|
| | | Lot A | Lot B |
| 1100 | 6.0 | 5 | 74 |
| 1200 | 6.0 | <3 | 67 |
| 1300 | 6.0 | <3 | <3 |
| 1100 | 0.73 | <3 | 14 |
| 1200 | 0.73 | <3 | 15 |
| 1300 | 0.73 | <3 | <3 |

TABLE 7B

| Temperature/Time (Heating Rate: 5° C./min) | F in Feed (%) | F after Calcination (ppm) |
|---|---|---|
| 1300° C./30 min | 6.4 | 50 |
| 1400° C./30 min | 6.4 | 38 |

EXAMPLE 8

Incomplete removal of fluorine in Example 7 might have been due to the stagnant environment in the furnace and readsorption of desorbed fluorine on silica during the cooling cycle. In the data presented in Table 8, removal of fluorine was facilitated by (i) attaching an aspirator to the furnace (Samples 8-A and 8-B) or (ii) providing an air purge, (Samples 8-C through 8-F).

TABLE 8

| Sample | Before Calcination F, ppm | After Calcination F, ppm | Temp/Time | Condition |
|---|---|---|---|---|
| 8-A | 273 | 14 | 1200° C./1 hr | Aspirator attached to the furnace |
| 8-B | 273 | 12 | 1200° C./1 hr | No aspirator |
| 8-C | 187 | 1.4 | 1200° C./1 hr | Air purge (a) |
| 8-D | 187 | 7.8 | 1200° C./1 hr | No air purge |
| 8-E | 31 | 1.0 | 1200° C./1 hr | Air purge (a) |
| 8-F | 31 | 1.6 | 1200° C./1 hr | No air purge |

(a) About 1 volume-exchange every 2 minutes.

These data illustrate that purging the atmosphere in the furnace during calcination lowers fluorine on silica after calcination.

EXAMPLE 9

To illustrate the effectiveness of a rotary calciner at lowering fluorine concentration on silica, silica was passed a plurality of times through a rotary calciner at 1000° C. The data summarized in Table 9 illustrate that a rotary calciner provided very effective fluorine reduction.

TABLE 9

| Number of Passes Through the Calciner | Estimated Retention Time in Heat Zone (min) | | F (ppm) |
|---|---|---|---|
| | Each Pass | Cumulative | |
| 0 | | 0 | 6700 |
| 1 | 7 | 7 | 230 |
| 2 | 10 | 17 | 69 |
| 3 | 16 | 33 | 38 |
| 4 | 10 | 43 | 15 |

EXAMPLE 10

The effect of flame fusion on fluorine on silica is illustrated in Tables 10A and 10B. Table 10A summarizes fluorine data from flame fused calcined silica after various processing steps in the production of transparent, bubble-free, amorphous silica particles from ammonium fluosilicate aqueous solution. Table 10B summarizes approximate ranges of fluorine, as determined by the Parr Bomb method, measured after flame fusion as a function of Parr Bomb extractable fluorine in the powder feed. This table illustrates the importance of insuring that the fluorine content of silica powder before fusion is less than about 20 wppm so that the fluorine content of fused product is less than about 3 wppm.

TABLE 10A

| | F, wppm after processing step | | |
|---|---|---|---|
| Calcined Condition | Precipitated Feed | Calcined Feed | Flame Fused Silica* |
| 1000° C./12 hrs | 665 | 6.4 | 0.41 |
| 1100° C./12 hrs | 665 | 5.0 | 0.85 (1.7) |

TABLE 10A-continued

| | F, wppm after processing step | | |
|---|---|---|---|
| Calcined Condition | Precipitated Feed | Calcined Feed | Flame Fused Silica* |
| 1000° C./6 hrs | 665 | 8.8 | 0.46 |

Note: Numbers in parentheses refer to Parr Bomb results.
*After wet-screening to remove the unfused silica.

TABLE 10B

| Fluorine in Feed Powder, wppm | Approximate Range Fluorine in Fused Product, wppm |
|---|---|
| 6 | 1.5–2.5 |
| 15 | 2–3.5 |
| 20 | 2.5–5 |
| 30 | 3–6 |

EXAMPLE 11

A solution having an ammonium fluosilicate concentration of 12–15 wt. percent was continuously ammoniated in accordance with the method of the invention to precipitate silica. Precipitated silica was filtered, washed, dried, and calcined at 1100° C. for 6 hours. Calcination reduced the level of extractable fluorine, determined by the Parr Bomb method, to below 10 ppm. Calcined silica was fused in an oxygen/hydrogen flame to produce good quality fused silica which was then ground in an air-jet mill to produce a ground fused powder of about 12 micron average size. To remove polyurethane contamination originating from the jet-mill lining, the powder was fired at 1000° C. for 1 hour to produce a filler powder suitable for application in microelectronic packaging. Analyses of the precipitated silica and the final filler products, presented in Table 11, illustrate the purity of silica made in accordance with the method of the invention and the ground fused silica powder produced therefrom.

TABLE 11

| Element, ppm | Precipitated Silica | Final Product |
|---|---|---|
| Al | 0.37 | 0.2 |
| Ca | 0.83 | 1.3 |
| Cr | 0.09 | <0.05 |
| Cu | 0.12 | <0.05 |
| Fe | 2.30 | 3.01 |
| K | <0.2 | 0.4 |
| Mg | 0.2 | <0.05 |
| Mn | 0.04 | 0.10 |
| Na | 1.0 | 1.0 |
| Ni | 0.0 | 0.15 |
| P | 0.17 | 0.15 |
| Mo | 0.09 | <0.05 |
| Pb | 0.2 | <0.05 |
| S | 3.07 | 0.13 |
| Zn | 0.14 | 0.20 |
| Ba, Cr, Cd and Sr | <0.05 | <0.05 |
| F* | — | 1.2 |
| U, ppb | — | <1 |

*Water extractable fluorine by Parr Bomb

Although preferred embodiments of the invention have been disclosed herein, those skilled in the art will appreciate that changes and modifications may be made without departing from the spirit of this invention, as defined in and limited only by the scope of the appended claims.

We claim:

1. A method of producing high purity silica powder which can be fused to form transparent, bubble-free particles from an aqueous solution of ammonium fluosilicate comprising:
   (a) removing colloidal material from said aqueous ammonium fluosilicate solution;
   (b) ensuring that the colloid-free ammonium fluosilicate solution of step (a) is unsaturated with respect to ammonium fluosilicate;
   (c) ammoniating said unsaturated solution to produce silica precipitate; and
   (d) recovering said silica precipitate.

2. The method of claim 1, further comprising fusing the precipitate of step (d) to produce transparent, bubble-free silica particles.

3. The method of claim 1 wherein the unsaturated ammonium fluosilicate solution of step (b) has a concentration of less than about 18 wt. percent.

4. The method of claim 3 wherein the unsaturated ammonium fluosilicate solution of step (b) has a concentration of less than about 15 wt. percent.

5. The method of claim 4 wherein the unsaturated ammonium fluosilicate solution of step (b) has a concentration of less than about 12 wt. percent.

6. The method of claim 1 further comprising treating the silica of step (d) to remove volatile impurities, said treatment selected from the group consisting of aqueous washing, hydrothermal leaching, calcination, and combinations thereof.

7. The method of claim 6 wherein said treatment is calcination carried out at a temperature between about 500°–1200° C.

8. The method of claim 7 wherein said calcination is carried out at a temperature between about 600°–850° C.

9. The method of claim 1 wherein the quantity of ammonia used in step (c) is at least about 100 percent of the stoichiometrically-required amount.

10. The method of claim 9 wherein the quantity of ammonia is between about 105–130 percent of the stoichiometrically-required amount.

11. The method of claim 10 wherein the quantity of ammonia is between about 120–130 percent of the stoichiometrically-required amount.

12. The method of claim 6 wherein the unsaturated ammonium fluosilicate solution of step (b) has a concentration of less than about 15 wt. percent.

13. The method of claim 12 wherein the unsaturated ammonium fluosilicate solution of step (b) has a concentration of less than about 12 wt. percent.

14. The method of claim 12, further comprising fusing the treated silica to produce transparent, bubble-free particles.

15. The method of claim 14 wherein the quantity of ammonia is between about 105–130 percent of the stoichiometrically-required amount.

16. The method of claim 15 wherein the quantity of ammonia is between about 120–130 percent of the stoichiometrically-required amount.

17. A batch method of producing high purity silica powder which can be fused to form transparent, bubble-free particles from an aqueous solution of ammonium fluosilicate comprising:
   (a) removing colloidal material from said aqueous ammonium fluosilicate solution;
   (b) ensuring that the colloid-free ammonium fluosilicate solution of step (a) is unsaturated with respect to ammonium fluosilicate;
   (c) ammoniating said unsaturated solution to produce silica precipitate; and (d) recovering said silica precipitate.

18. The method of claim 17, further comprising fusing the precipitate of step (d) to produce transparent, bubble-free silica particles.

19. The method of claim 17 wherein the unsaturated ammonium fluosilicate solution of step (b) has a concentration of less than about 20 wt. percent.

20. The method of claim 19 wherein the unsaturated ammonium fluosilicate solution of step (b) has a concentration of less than about 15 wt. percent.

21. The method of claim 17 further comprising treating the silica of step (d) to remove volatile impurities, said treatment selected from the group consisting of aqueous washing, hydrothermal leaching, calcination, and combinations thereof.

22. The method of claim 21 wherein said treatment is calcination carried out at a temperature between about 500°–1200° C.

23. The method of claim 17 wherein the quantity of ammonia used in step (c) is at least about 100 percent of the stoichiometrically-required amount.

24. The method of claim 23 wherein the quantity of ammonia is between about 120–130 percent of the stoichiometrically-required amount.

25. The method of claim 18 wherein the unsaturated ammonium fluosilicate solution of step (b) has a concentration of less than about 15 wt. percent.

26. The method of claim 18 further comprising, before fusion, treating the silica of step (d) to remove volatile impurities, said treatment selected from the group consisting of aqueous washing, hydrothermal leaching, calcination, and combinations thereof.

27. The method of claim 26 wherein said treatment is calcination carried out at a temperature between about 500°–1200° C.

* * * * *

UNITED STATES PATENT AND TRADEMARK OFFICE
CERTIFICATE OF CORRECTION

PATENT NO. : 5,028,407

DATED : July 2, 1991

INVENTOR(S) : Chieng et al.

It is certified that error appears in the above-identified patent and that said Letters Patent is hereby corrected as shown below:

Column 8, line 13, "claimed" should read --calcined--

Signed and Sealed this

Third Day of November, 1992

Attest:

DOUGLAS B. COMER

Attesting Officer     Acting Commissioner of Patents and Trademarks